(12) United States Patent
Venkataswami et al.

(10) Patent No.: US 9,942,054 B2
(45) Date of Patent: *Apr. 10, 2018

(54) SYSTEMS AND METHODS FOR AN EXTRANET MULTICAST VIRTUAL PRIVATE NETWORK IN A VIRTUAL ROUTING AND FORWARDING BASED CUSTOMER EDGE DEVICE

(71) Applicant: Dell Products L.P., Round Rock, TX (US)

(72) Inventors: Balaji Venkat Venkataswami, Tamilnadu (IN); Bhargav Bhikkaji, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/947,934

(22) Filed: Nov. 20, 2015

(65) Prior Publication Data

US 2016/0080160 A1 Mar. 17, 2016

Related U.S. Application Data

(63) Continuation of application No. 13/797,769, filed on Mar. 12, 2013, now Pat. No. 9,197,426.

(51) Int. Cl.
*H04L 12/18* (2006.01)
*H04L 12/713* (2013.01)
(Continued)

(52) U.S. Cl.
CPC .............. *H04L 12/18* (2013.01); *H04L 45/16* (2013.01); *H04L 45/54* (2013.01); *H04L 45/586* (2013.01);
(Continued)

(58) Field of Classification Search
CPC ...... H04W 8/082; H04W 80/04; H04L 45/50; H04L 12/185; H04L 45/16;
(Continued)

(56) References Cited

U.S. PATENT DOCUMENTS

| 8,953,446 | B1 * | 2/2015 | Wang | H04L 12/4641 370/231 |
| 2006/0088031 | A1 * | 4/2006 | Nalawade | H04L 12/185 370/390 |

(Continued)

OTHER PUBLICATIONS

Cisco Systems, Inc., Title: "Configuring Multicast VPN Extranet Support," http://www.cisco.com/en/US/docs/ios/12_2sb/feature/guide/extvpnsb.html, First Published Dec. 4, 2006, Last Updated Aug. 21, 2007, 42 pages.

(Continued)

*Primary Examiner* — Jung-Jen Liu
(74) *Attorney, Agent, or Firm* — Haynes and Boone, LLP (57) ABSTRACT

An information handling system is provided. The information handling system includes a customer edge device coupled to a provider edge device. The customer edge device provides a default virtual routing and forwarding (VRF) instance that receives a multicast stream from the provider edge device. The information handling system also includes a plurality of host devices and a plurality of virtual local area networks (VLANs). Each of the VLANs includes at least one of the host devices and is assigned to a subscribing VRF instance, with each of the subscribing VRF instances subscribing to the default VRF instance in order to receive a copy of the multicast stream from the provider edge device. The single copy of the multicast stream is transmitted over the PE-CE link regardless of the number of subscribing VRFs.

17 Claims, 4 Drawing Sheets

(51) Int. Cl.
*H04L 12/761* (2013.01)
*H04L 12/741* (2013.01)
*H04L 12/931* (2013.01)

(52) U.S. Cl.
CPC ........ *H04L 49/354* (2013.01); *H04L 12/1863* (2013.01)

(58) Field of Classification Search
CPC . H04L 12/4641; H04L 12/4633; H04L 12/56; H04L 12/1886; H04L 45/04
See application file for complete search history.

(56) References Cited

U.S. PATENT DOCUMENTS

| | | | | |
|---|---|---|---|---|
| 2008/0101360 | A1* | 5/2008 | Napierala | H04L 12/1836 370/390 |
| 2008/0240098 | A1* | 10/2008 | Uttaro | H04L 12/66 370/392 |
| 2009/0092140 | A1* | 4/2009 | Gibbons | H04L 45/04 370/395.31 |
| 2010/0177685 | A1* | 7/2010 | Aggarwal | H04L 45/50 370/328 |
| 2012/0147894 | A1* | 6/2012 | Mulligan | G06F 9/45533 370/395.53 |
| 2012/0170578 | A1* | 7/2012 | Anumala | H04L 12/1886 370/390 |
| 2014/0269700 | A1 | 9/2014 | Venkataswami et al. | |

OTHER PUBLICATIONS

Cisco Systems, Inc., Title: "OSPF Support for Multi-VRF on CE Routers," http://www.cisco.com/en/US/docs/ios/12_0st/12_0st21/feature/guide/ospfvrfl.html, Retrieved Mar. 12, 2013, 12 pages.

Cisco Systems, Inc., Title: "Configuring VRF-lite," Chapter 36, http://www.cisco.com/en/US/docs/switches/lan/catalyst4500/12.2/53SG/configuration/vrf.pdf, Retrieved Mar. 12, 2013, 16 pages.

Cisco Systems, Inc., Title: "Multi-VRF and IP Multicast", White Paper, http://www.cisco.com/en/US/technologies/tk648/tk828/tk363/technologies_white_paper0900aecd8012033f.html, Retrieved Mar. 12, 2013, 17 pages.

* cited by examiner

SYSTEMS AND METHODS FOR AN EXTRANET MULTICAST VIRTUAL PRIVATE NETWORK IN A VIRTUAL ROUTING AND FORWARDING BASED CUSTOMER EDGE DEVICE

CROSS-REFERENCE TO RELATED APPLICATIONS

This application is a Continuation of U.S. patent application Ser. No. 13/831,615 filed on Mar. 15, 2013, entitled "DYNAMIC NETWORK LOAD REBALANCING," the disclosure of which is incorporated herein by reference.

BACKGROUND

1. Technical Field

The present disclosure is related to information handling systems. In particular, embodiments disclosed herein are related to information handling systems used in extranet multicast virtual private networks.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As technology spreads to various parts of the global economy over the last several decades, new practices have arisen to fully leverage that technology. In financial markets, the increase of technology has brought computerized markets and trading, and in particular has allowed for high-frequency trading, or HFT. HFT uses computers to collect market data rapidly and then execute trades in which an investment or position may be held for a short period of time, perhaps less than a second. Algorithms can be programmed by an operator and then automatically executed when a computer detects certain conditions from a stream of financial data.

In order for HFT to operate efficiently, valuable market data must be gathered and accessed quickly by authorized customers. In some instances one customer may subscribe to some market data while not subscribing to other market data. The provision of market data and the buying and selling of investments should be kept confidential between HFT firms even if they share a single network provider's network. The existing information handling systems that are used in this field have not proven entirely satisfactory to date.

SUMMARY

Consistent with some embodiments, there is provided a network device operating as a customer edge device at a site, the network device including one or more processors in communication with the plurality of interfaces and a memory, a plurality of forwarding tables stored in the memory, and a plurality of virtual routing and forwarding (VRF) instances. Each of the plurality of VRF instances is associated with one of the plurality of forwarding tables, and the plurality of VRF instances includes a number of subscribing VRF instances and a default VRF instance. A multicast stream received on the default VRF instance is replicated by the one or more processors and transmitted to each of the subscribing VRF instances.

Consistent with some embodiments, there is provided an information handling system. The information handling system includes a customer edge device coupled to a provider edge device, a plurality of customer-side networked devices, and a plurality of virtual local area networks (VLANs). The customer edge device provides a default virtual routing and forwarding (VRF) instance that receives a multicast stream from the provider edge device. Additionally, each of the VLANs includes at least one of the customer-side networked devices and is assigned to a subscribing VRF instance. In the information handling system, each of the subscribing VRF instances subscribes to the default VRF instance to receive a copy of the multicast stream.

Consistent with some embodiments, there is provided a method for providing a multicast stream transmitted from a provider edge device to a customer edge device. The method includes steps of receiving the multicast stream at the provider edge device and of transmitting a single copy of the multicast stream from the provider edge device to the customer edge device. The method further includes steps of receiving the single copy of the multicast stream on a default virtual routing and forwarding (VRF) instance and of replicating the single copy of the multicast stream on the customer edge device to provide a replicated copy to each of a plurality of subscribing VRF instances.

These and other embodiments will be described in further detail below with respect to the following figures.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processors or processing resources such as a central processing unit (CPU) or hardware or software control logic, ROM, and/or other types of nonvolatile memory. Additional components of the information handling system may include one or more disk drives, one or more network interfaces for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, DVD-ROM, any other optical medium, RAM, PROM, EPROM, FLASH-EPROM, any other memory chip or cartridge, and/or any other medium from which a processor or computer is adapted to read.

Figure 1:
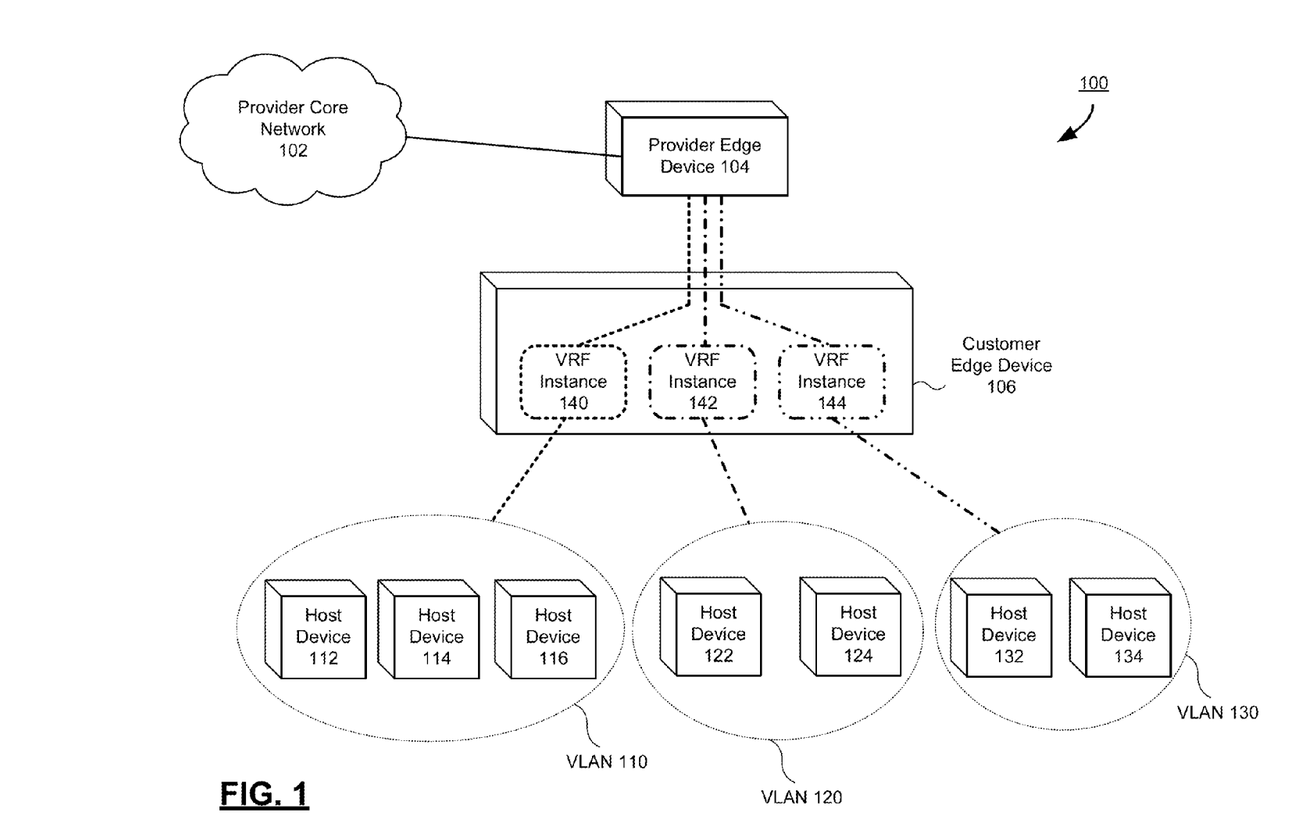
FIG. 1 is a diagram of an extranet multicast virtual private network with a customer edge device receiving several multicast streams.

FIG. 1 depicts an information handling system 100 such as may be used in a high frequency trading (HFT) platform. In the depicted embodiment, information handling system 100 includes a virtual private network (VPN) site and is connected to other VPN sites over a provider core network 102, which may be a multiprotocol label switching (MPLS) network. The owner of the provider core network has a provider edge device 104 located at the VPN site in order to provide access to the provider core network 102. In order for one or more customers of the owner of the provider core network 102 to access the provider core network 102, a customer edge device 106 is coupled to the provider edge device 104. In many situations the customer edge device 106 and the provider edge device 104 are coupled by a single provider-edge to customer-edge (PE-CE) link.

As depicted, a plurality of host devices is included in information handling system 100. In embodiments related to HFT, the host devices may be trading workstations, trading servers, or other such networked devices. The host devices are grouped into a number of virtual local area networks (VLANs). As depicted, VLAN 110 includes three host devices: host device 112, host device 114, and host device 116. VLAN 120 includes host devices 122 and 124. And VLAN 130 includes host devices 132 and 134.

In some embodiments, each VLAN depicted in information handling system 100 is used by a different customer of a provider of financial data, such as stock ticker feeds and other feeds. In some embodiments, the three VLANs are used by a single customer who for various reasons needs to operate multiple VLANs. Combinations of such cases are present in yet other embodiments. Particularly in embodiments in which each VLAN is used by a different customer of financial data supply services, the VLANs are used to isolate traffic to protect confidentiality and potentially maintain company trade secrets and strategies.

As depicted, customer edge device 106 is a Layer 2/Layer 3 device, communicating with the host devices over a Layer 2 protocol and communicating with the provider edge device over a Layer 3 protocol. In addition to supporting VLANs 110, 120, and 130, customer edge device 106 supports a plurality of virtual routing and forwarding (VRF) instances. In supporting multiple VRF instances, customer edge device 106 is configured to store a plurality of routing tables in memory at the same time. These routing tables are known as forwarding information bases, or forwarding tables, with one table per VRF instance. In certain embodiments, the forwarding table of one VRF instance is inaccessible to another VRF instance. Accordingly, the VRF instances supported by customer edge device 106 may, like the VLANs 110, 120, and 130, provide a barrier between the traffic of multiple customers. Each VRF instance has a VRF instance identifier by which each customer-side router supporting the VRF instance in an information handling system is identified. On each router, a forwarding table is stored in memory for each supported VRF instance.

In the depicted embodiment, the customer edge device 106 supports three VRF instances: a VRF instance 140, a VRF instance 142, and a VRF instance 144. The VRF instance 140 is associated with VLAN 110, VRF instance 142 is associated with VLAN 120, and VRF instance 144 is associated with VLAN 130. In combination, a given VRF instance and its associated VLAN may prevent one customer's traffic from being intercepted by another. The VRF implementation on information handling system 100 may be a VRF Lite implementation.

As depicted, the customers who own VLANs 110, 120, and 130 all want to receive a multicast stream. In this example, the multicast stream provides financial and market data that may be used by computer-controlled algorithms and/or traders operating the host devices to make investment decisions and to execute trades. To do this, the provider edge device 104 receives the multicast stream from the stream producer over provider core network 102. The provider edge device 104 then replicates the multicast stream and transmits each replicated stream over the PE-CE link to the customer edge device 106. Each of VRF instances 140, 142, and 144 receives a replicated copy from the provider edge device 104 and then transmits it on the interfaces of the customer edge device 106 according its respective forwarding table.

As depicted, three copies of the multicast stream are transmitted from provider edge device 104 to customer edge device 106. However, in many practical instances the number of VLANs and associated VRFs located on the customer side may be significantly greater than three. In general, for a given number of VRFs behind the customer edge device, the bandwidth used on the PE-CE link is the bandwidth taken by the multicast stream times the given number.

Figure 2:
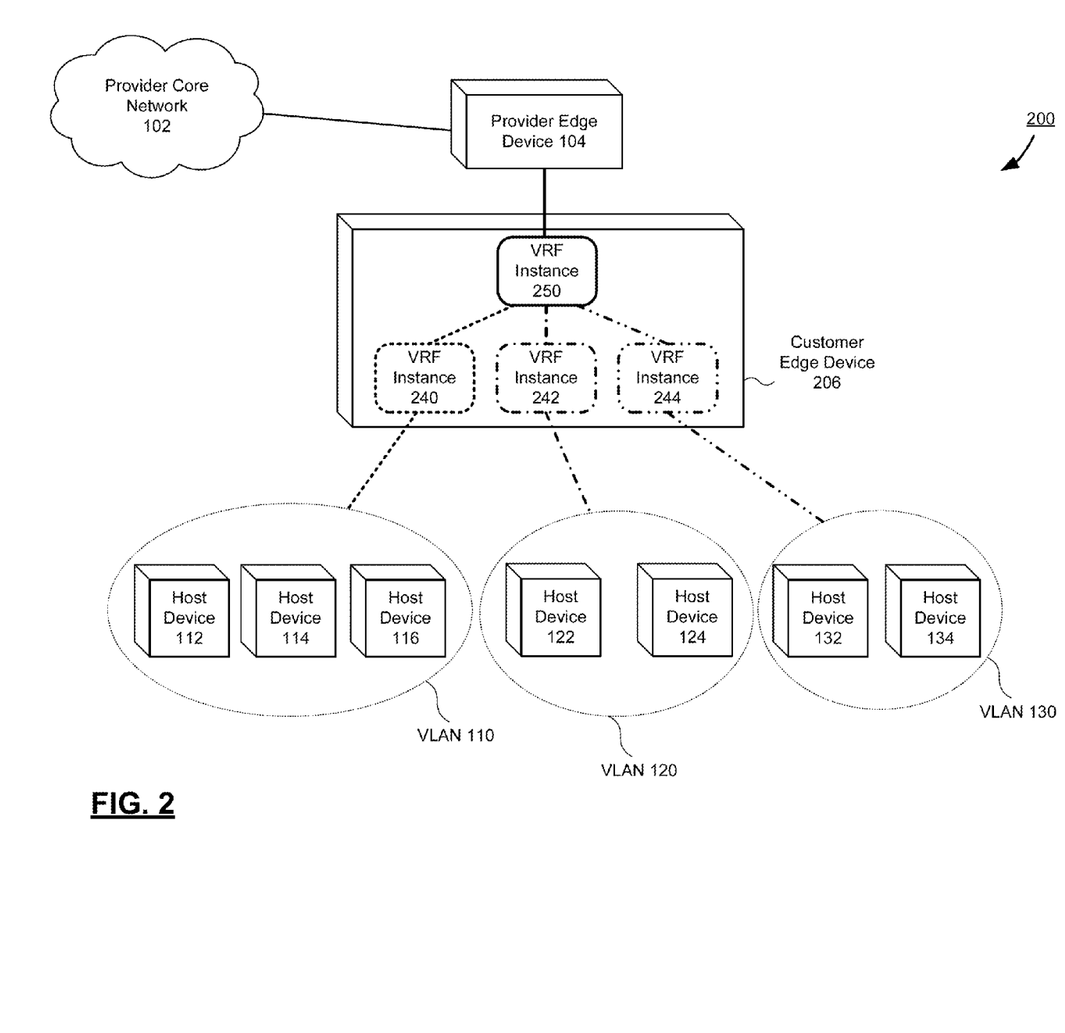
FIG. 2 is a diagram of an extranet multicast virtual private network with a customer edge device receiving a single multicast stream according to an embodiment.

FIG. 2 depicts an information handling system 200 configured as an Extranet multicast virtual private network with a customer edge device receiving a single multicast stream. By having the customer edge receive a single multicast stream, i.e. a single copy of a subscribed-to multicast stream, considerable bandwidth on the PE-CE link is conserved. The information handling system 200 of FIG. 2 shares many of the features of information handling system 100 of FIG. 1. Information handling system 200 includes a provider core network 102 over which traffic can flow to and from different network sites. The network provider has a provider edge device 104 installed at the depicted site. The provider edge device 104 communicates with a customer-edge device 206 over a PE-CE link. In turn, the customer edge device 206 is coupled by a plurality of interfaces or ports to a number of VLANs.

As in information handling system 100, information handling system 200 is depicted as having VLANs 110, 120, and 130. VLAN 110 includes three host devices, host device 112, host device 114, and host device 116. VLAN 120 includes host devices 122 and 124. And VLAN 130 includes host devices 132 and 134. Each of the VLANs is associated with a VRF instance operating on the customer edge device 206. Given that the interfaces of these VRF instances are coupled to the host devices behind the customer edge device 206, these VRF instances may be considered as being behind customer edge device 206. As depicted, a VRF instance 240 is associated with VLAN 110, a VRF instance 242 is associated with VLAN 120, and a VRF instance 244 is associated with VLAN 130. Each of the VRF instances on information handling system 200 may be VRF Lite implementations, so while the provider core network 102 may have be an MPLS network, the customer side network may not be. Some embodiments of information handling system 200 include many more VRFs and associated VLANs.

Unlike in information handling system 100, information handling system 200 includes at least one more VRF instance than the number of VLANs communicating with customer edge device 206. This additional VRF instance, VRF instance 250, may be used as the default VRF instance on the customer edge device 206. So that only a single copy of a requested multicast stream occupies bandwidth on the PE-CE link, customer edge device 206 sends a protocol-independent multicast (PIM) join message to the provider edge device 104 to request the multicast stream be delivered on the default VRF instance 250, which is the subscriber in the PIM join request. Thereafter, the multicast stream can be transmitted from another VPN site, a VPN site of the company providing the financial multicast stream, across the provider core network 102 and to the provider edge device 104. When the provider edge device 104 receives only the single PIM join sent by the customer edge device 206 to receive the multicast stream, a single copy of the multicast stream is transmitted over the PE-CE link.

So that the host devices that are part of VLANs 110, 120, and 130 are able to receive the multicast stream, the VRF instances 240, 242, and 244 associated with the VLANs each send PIM joins to the customer edge device 206 to request the stream. These PIM joins may be formed and received within, or internal to, the customer edge device 206. Thus, internal PIM join may be used entirely within the customer edge device 206 to request the stream. The customer edge device 206 receives the PIM joins, which are requests to receive whatever is received on the default VRF instance 250. In this embodiment in which the multicast stream is received on the default VRF instance 250, the multicast stream is received on the customer edge device 250, replicated, and sent out on the outgoing interfaces of customer edge device 250 that are associated with VRF instances 240, 242, and 244. The outgoing interfaces associated with VRF instances 240, 242, and 244 are included in an outgoing interface list. Thereby, the multicast stream is transmitted to the host devices in VLANs 110, 120, and 130.

In contrast with information handling system 100, in information handling system 200, a single copy of the multicast stream is received from the provider edge device 104 on the customer edge device 206. The customer edge device 206 then replicates the multicast stream and distributes it to a plurality of subscribing VRF instances. Bandwidth on the PE-CE link is conserved by the transmission of the single copy of the multicast stream.

Figure 3:
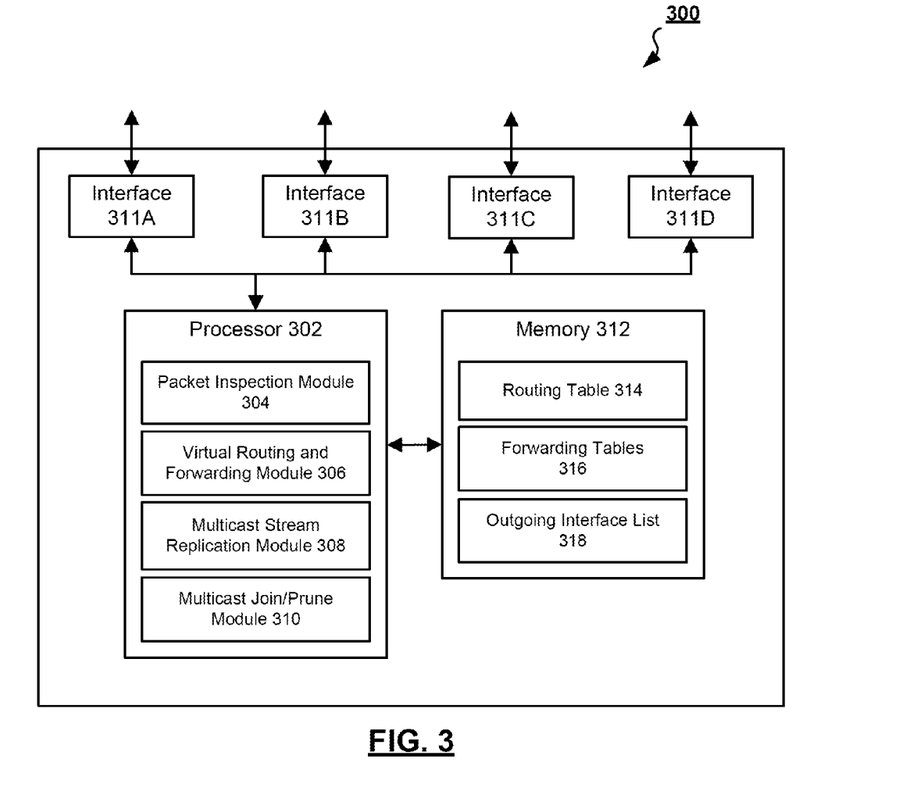
FIG. 3 is a diagram of an information handling device that serves as a customer edge device according to an embodiment.

FIG. 3 depicts a network device 300, such as may be used for customer edge device 206 of FIG. 2. Network device 300, includes one or more processors, like processor 302. In some embodiments, processor 302 may include network processing units and/or central processing units. Working in conjunction with executable code stored in memory, or by implementation as application specific integrated circuits (ASICs), processor 302 provides a plurality of modules. As depicted, processor 302 provides a packet inspection module 304 that may be used to extract information from a received packet, such as destination and source addresses contained in the header of the packet. Some embodiments of the packet inspection module 304 may be configured to perform deep packet inspection.

Processor 302 also provides a virtual routing and forwarding (VRF) module 306. The VRF module 306 associates and identifies associations between destination addresses and/or prefixes, storing the associations in forwarding tables 316 in a memory 312, which represents a plurality of forwarding tables, with one of forwarding tables 316 being maintained for each VRF instance operating on the network device 300. In the context of information handling system 200 of FIG. 2, VRF module 306 may create forwarding tables for each of VRF instances 240, 242, and 244 and the default VRF instance 250.

Processor 302 of network device 300 further provides a multicast stream replication module 308. The multicast stream replication module 308 is configured to replicate a multicast stream such as that received by default VRF 250 of information handling system 200. The replication of a received multicast stream may provide one copy each for a plurality of subscribing VRF instances.

To permit and organize the subscription of VRF instances, processor 302 provides a multicast join/prune module 310. The join/prune module 310 provides a number of services in forming and maintaining multicast groups. For example, in order to allow the default VRF instance 250 of FIG. 2 to receive a multicast stream, i.e. become a member of the associated multicast group, the join/prune module 310 sends a PIM join message or request to the provider edge device 102 with an identifier of the default VRF instance as the subscriber. Thereafter, the provide edge device 102 transmits the multicast stream on the interface on which the PIM join message was received to the default VRF instance 250.

Additionally, the join/prune module 310 is configured to receive PIM join messages from coupled host and network devices. Join/prune module 310 may also send and receive PIM join messages internal to network device 300. As discussed above in connection with information handling system 200, the join/prune module 310 receives internal PIM join messages from VRF instances to subscribe them as member of a multicast group. These PIM joins are internal to network device 300. In some embodiments, the join messages from the VRF instances may be Internet Group Management Protocol (IGMP) joins, rather than or in addition to PIM joins. In this way, the VRF instances 240, 242, and 244 subscribe to the default VRF instance 250. Such VRF instances may be referred herein to as subscribing VRF instances.

Network device 300 acts as the designated router in maintaining the group, sending and receiving join/prune messages associated with the multicast group members. The VRF module 306 of network device 300 also maintains a multicast forwarding table in memory 312 as part of the forwarding tables 316. This multicast forwarding table also maintains a plurality of static multicast routes for each VRF instance for use in reverse path forwarding (RPF) checks. These static multicast routes point to the default VRF instance 250 in some embodiments, and to the source of the multicast stream in others. If no static multicast routes are found in memory 312, PIM join or IGMP join messages may be ignored by the join/prune module 310.

As depicted, network device 300 includes four interfaces, interfaces 311A, 311B, 311C, and 311D, by which information may be received on and transmitted from network device 300. Embodiments of network device 300 include more or fewer interfaces than are depicted in FIG. 3. As join messages are received by join/prune module 310, the VRF module 306 may add each interface associated with each subscribing VRF instance to an outgoing interface list 318. Outgoing interface list 318 may then be used by the multicast stream replication module 308 in determining which interfaces on which the multicast stream should be transmitted, and therefore how many copies should be made.

As discussed above, network device 300 includes the memory 312. In various embodiments, memory 312 may be a plurality of individual memory modules and types of memory. For example, memory 312 may include ROM, RAM, CAM, and/or other types of memory. As depicted, memory 312 has a routing table 314 and the forwarding tables 316 stored therein. The outgoing interface list 318 is used when the multicast stream is to be sent on interfaces associated with the subscribing VRF instances and their associated VLANs.

As discussed, one or more of the modules depicted as being provided by processor 302 may be provided in various configurations. For example, in one embodiment, the depicted modules are provided by software running on processor 302, in another, each module is an ASIC, and in yet another, each module is a combination of hardware and software.

Figure 4:
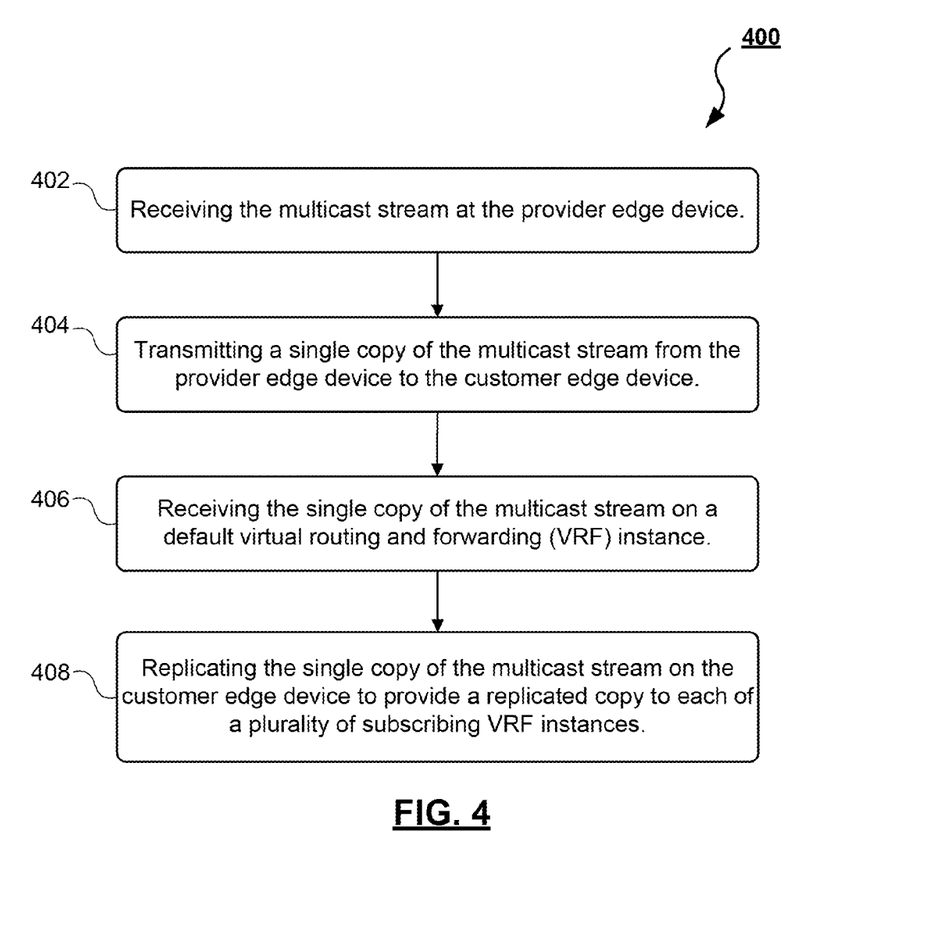
FIG. 4 is a flowchart of a method for providing a multicast stream transmitted from a provider edge device to a customer edge device.

FIG. 4 is a flowchart of a method 400 for providing a multicast stream transmitted from a provider edge device to a customer edge device and then to coupled host devices. As depicted, method 400 includes a plurality of steps. Various embodiments of method 400 may include additional steps, not described herein, before, after, and in between the depicted steps. Method 400 begins in step 402 when a provider edge device receives a multicast stream from a remote VPN site over a provider core network. In step 404, the provider edge device transmits a single copy of the multicast stream to a customer edge device. The customer edge device receives the single copy of the multicast stream on a default VRF instance, in step 406. Then, at step 408, the single copy of the multicast stream is replicated by the customer edge device and provided to each of a plurality of subscribing VRF instances. Each of the subscribing VRF instances may be assigned to one of a plurality of VLANs on the customer side.

Some embodiments of method 400 include a step of receiving a PIM join request or message from the customer edge device at the provider edge device requesting the multicast stream. Similarly, embodiments may include receiving PIM join requests from each of the subscribing VRF instances at the customer edge device. These PIM join requests may be received as by the default VRF instance on the customer edge device. After receiving the PIM join requests, the customer edge device may build an outgoing interface list that includes interfaces associated with the subscribing VRF instances.

Some embodiments of information handling systems 100, 200 and network device 300 include tangible, non-transient, machine-readable media that include executable code that when run by a processor, such as processor 302 of network device 300 in FIG. 3, may cause the processor to perform the steps of method 400 as described above. Some common forms of machine-readable media that may include the steps of method 400 are, for example, floppy disk, flexible disk, hard disk, magnetic tape, any other magnetic medium, CD-ROM, DVD-ROM, any other optical medium, punch cards, paper tape, any other physical medium with patterns of holes, RAM, PROM, EPROM, FLASH-EPROM, any other solid-state memory chip or cartridge, and/or any other medium from which a processor or computer is adapted to read. The machine-readable media may be memory 312 of FIG. 3.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A network device, comprising:
a host interface that is configured to couple to a plurality of host devices;
a provider interface that is configured to couple to a provider device;
a processing system that is coupled to the host interface and the provider interface; and
a memory system that is coupled to the processing system and that includes information that, when utilized by the processing system, causes the processing system to:
receive, by a default virtual routing and forwarding (VRF) instance associated with the provider interface, a single multicast stream through the provider interface;
replicate, by the default VRF instance, the single multicast stream to provide a plurality of replicated multicast streams; and
provide, by the default VRF instance, each of the plurality of replicated multicast streams through a respective one of a plurality of subscribing VRF instances that are associated with the host interface and to a subset of the plurality of host devices coupled to the host interface associated with that respective one of the plurality of subscribing VRF instances.

2. The network device of claim 1, wherein the information included on the memory system includes a plurality of forwarding tables, and wherein each of the plurality of forwarding tables is utilized by the processing system to provide a respective one of the plurality of subscribing VRF instances.

3. The network device of claim 1, wherein the memory system includes information that, when utilized by the processing system, causes the processing system to:
create the plurality of forwarding tables.

4. The network device of claim 1, wherein each of the plurality of subscribing VRF instances is associated with a respective Virtual Local Area Network (VLAN) that includes a subset of the plurality of host devices.

5. The network device of claim 1, wherein the memory system includes information that, when utilized by the processing system, causes the processing system to:
  send a request through the provider interface to receive the single multicast stream.

6. An information handling system comprising:
  a provider device;
  a plurality of host devices;
  a network device coupled to each of the plurality of host devices and the provider device, wherein the network device is configured to:
    receive, by a default virtual routing and forwarding (VRF) instance that is provided on the network device and associated with the provider interface, a single multicast stream through the provider interface;
    replicate, by the default VRF instance, the single multicast stream to provide a plurality of replicated multicast streams; and
    provide, by the default VRF instance, each of the plurality of replicated multicast streams through a respective one of a plurality of subscribing VRF instances that are provided on the network device and to a respective subset of the plurality of host devices associated with that respective one of the plurality of subscribing VRF instances.

7. The information handling system of claim 6, wherein the network device includes a plurality of forwarding tables that are each utilized to provide a respective one of the plurality of subscribing VRF instances.

8. The information handling system of claim 7, wherein the network device is configured to:
  create the plurality of forwarding tables.

9. The information handling system of claim 6, wherein each of the plurality of subscribing VRF instances is associated with a respective Virtual Local Area Network (VLAN) that includes the respective subset of the plurality of host devices associated with that respective one of the plurality of subscribing VRF instances.

10. The information handling system of claim 6, wherein the network device is configured to:
  send a request to the provider device to receive the single multicast stream.

11. The information handling system of claim 6, wherein the network device is configured to:
  subscribe the default VRF instance to the single multicast stream from the provider device.

12. A method for providing a multicast stream, comprising:
  receiving, by a default VRF instance provided on a network device and associated with a provider device, a single multicast stream from the provider device;
  replicating, by the default VRF instance, the single multicast stream to provide a plurality of replicated multicast streams; and
  providing, by the default VRF instance, each of the plurality of replicated multicast streams through a respective one of a plurality of subscribing VRF instances that are provided on the network device and to a respective subset of a plurality of host devices associated with that respective one of the plurality of subscribing VRF instances.

13. The method of claim 12, wherein the network device includes a plurality of forwarding tables that are each utilized to provide a respective one of the plurality of subscribing VRF instances.

14. The method of claim 13, further comprising:
  creating, by the network device, the plurality of forwarding tables.

15. The method of claim 13, wherein each of the plurality of subscribing VRF instances is associated with a respective Virtual Local Area Network (VLAN) that includes the respective subset of the plurality of host devices associated with that respective one of the plurality of subscribing VRF instances.

16. The method of claim 12, further comprising:
  sending, by the network device, a request to the provider device to receive the single multicast stream.

17. The method of claim 12, further comprising:
  subscribing, by the network device, the default VRF instance to the single multicast stream from the provider device.

* * * * *

UNITED STATES PATENT AND TRADEMARK OFFICE
CERTIFICATE OF CORRECTION

PATENT NO. : 9,942,054 B2
APPLICATION NO. : 14/947934
DATED : April 10, 2018
INVENTOR(S) : Balaji Venkat Venkataswami and Bhargav Bhikkaji It is certified that error appears in the above-identified patent and that said Letters Patent is hereby corrected as shown below:

In the Claims

In Claim 5, Column 9, Line 14: please replace "interface" with --device--;

In Claim 5, Column 9, Line 15: please replace "through" with --from--;

In Claim 5, Column 9, Line 15, 16: please replace "interface" with --device--.

Signed and Sealed this
Tenth Day of July, 2018

Andrei Iancu
*Director of the United States Patent and Trademark Office*